May 15, 1934.   H. I. MORRIS   1,959,292
POWER MECHANISM AND CUT-OUT DEVICE
Filed Nov. 21, 1927   2 Sheets-Sheet 2

INVENTOR
Howard I Morris
BY
Geo. A. Pitts
ATTORNEY

Patented May 15, 1934

1,959,292

UNITED STATES PATENT OFFICE 1,959,292

POWER MECHANISM AND CUT-OUT DEVICE

Howard I. Morris, Cleveland, Ohio, assignor to The Yoder-Morris Company, Cleveland, Ohio, a corporation of Ohio Application November 21, 1927, Serial No. 234,852

3 Claims. (Cl. 192—129)

This invention relates to a power transmitting mechanism and safety cut-out devices capable of cutting off the power to the motor that drives such mechanism.

One object of the invention is to construct a power transmission mechanism and safety cutout devices that are relatively simple and readily and positively operated to prevent heating or damage to the driving motor or damage to any part of the mechanism or apparatus connected with and operated thereby, when stoppage of the driven part or parts takes place.

Another object of the invention is to construct a cutout mechanism that will respond relatively quickly when the driving motor is overloaded.

Another object of the invention is to provide a mechanically operated cutout mechanism, not depending upon the electrical energy supplied to the motor, for opening the motor circuit when said motor becomes overloaded.

Other objects of the invention will be apparent to those skilled in the art to which my invention relates from the following description taken in connection with the accompanying drawings, wherein Fig. 1 is a bottom plan view of a power transmission mechanism and safety cutout devices embodying my invention, such view showing one application of the invention in connection with an apparatus for opening and closing the doors of a building, such as a garage.

Figure 1:
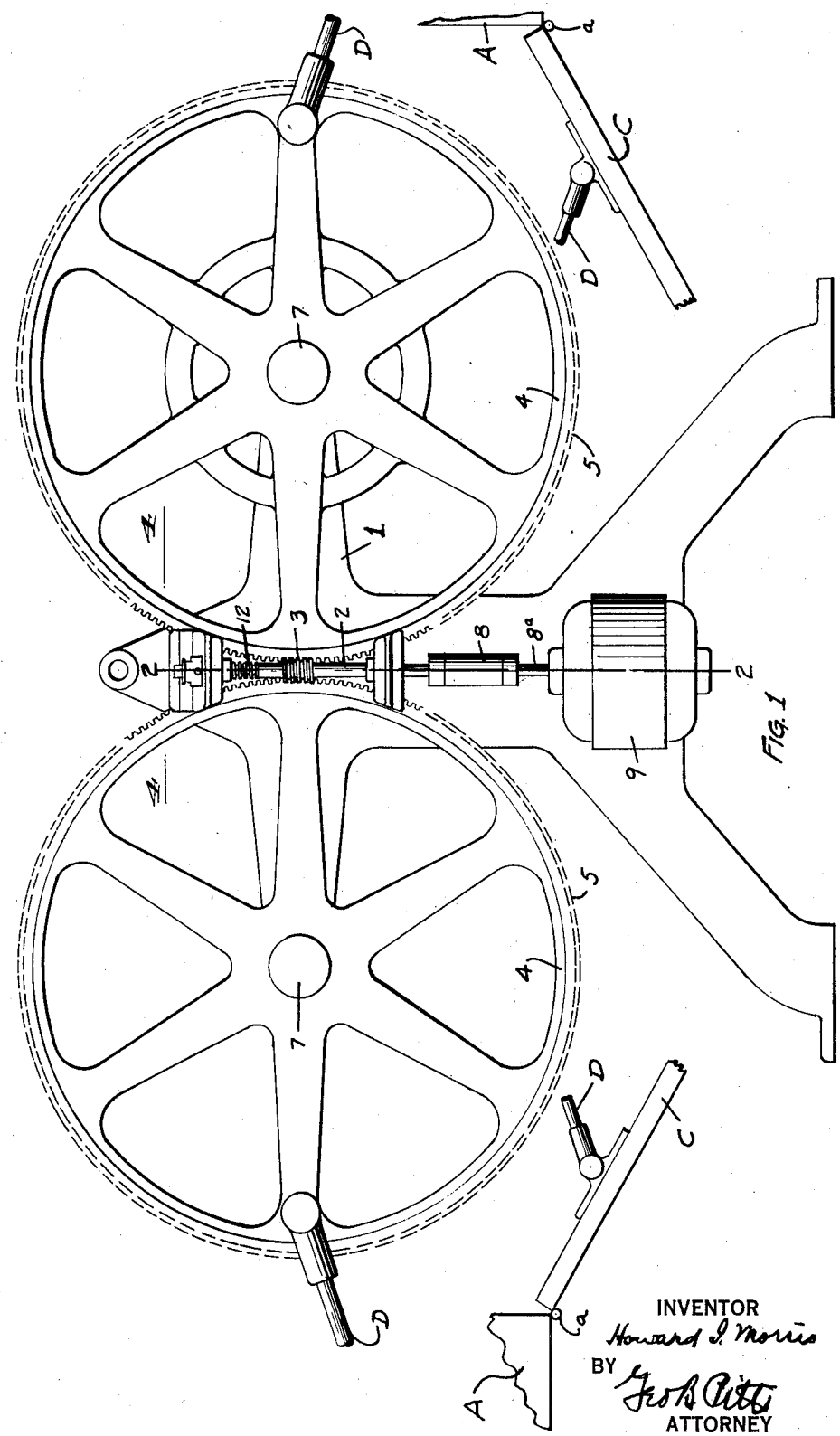

In the drawings, 1 indicates as an entirety a support on which are mounted two related rotary members provided with power transmitting elements which mesh one with the other, whereby one member is driven by the other, such elements being of a character or form that in the event the driven one of said members is retarded in its movement or stopped, one of said members, preferably the driving member, will be bodily moved relative to its support and operate a cut-out device.

The related rotary members, in the preferred form of construction, comprise a shaft 2 the power transmitting elements of which comprise a worm 3 and a gear 4 the power transmitting elements of which comprise teeth 5 complementary to the worm 3. The worm 3 is fixed to or formed integrally with the shaft 2, the opposite end portions of which rotatably and slidably fit suitable bearings provided in hangers 6 depending from the support 1. The worm gear 4 is mounted on a stud shaft 7 the upper end of which may be threaded into an opening formed in the support 1. The inner end of the shaft 2 is connected through driving connections 8 with the shaft 8a of a motor 9, preferably of the electric type, supported by the support 1. It will be understood that the driving connections 8 may be a gear train or other form of driving connections, but where the motor 9 and the shaft 2 to be driven are in line with each other, as shown, such connections may be a direct one or through a flexible coupling, that shown comprising a section of flexible tubing, suitably keyed by a device 10 to the outer end of the motor shaft 8a and non-rotatively but slidably connected to the adjacent end of the driving shaft 2, by a device 11, whereby the shaft may slide endwise relative to the connections 8 for the purpose of operating the cut-out, as will later appear.

The opposite end portions of the shaft 2 are reduced to form shoulders 2a, 2b, and between the latter shoulder and the adjacent hanger 6 I mount a compression spring 12, coiled around the reduced portion of the shaft, normally tending to move the shaft toward the left (as viewed in Figs. 2 and 3) or inwardly with the shoulder 2a engaging a suitable thrust bearing 13. The spring 12 is provided with sufficient strength to make it capable of overcoming the thrust of the shaft 2, due to the transmission of power from the worm 3 to the gear or gears 4, under normal load conditions, so that the worm 3 and worm gears 4 will be maintained in normal driving or meshing relation; such normal load conditions in the illustrated application of my invention being the weight of the doors and friction set up in swinging them. I prefer to mount between the outer end of the spring 12 and the adjacent hanger 6 a suitable thrust bearing 14 to take the thrust of the shaft 2 outwardly when the gear or gears 4 are locked or held against rotation as will later appear.

As already set forth, I have shown my power transmission mechanism and safety cut-out devices as applied to an apparatus for opening and closing doors of a building. In the illustrated arrangement, the support 1 is mounted above the door opening formed between uprights A, A, and a suitable cross member and the opening is closed by two doors C each hinged at a. Where two doors C are employed, I provide two worm gears 4, each connected by a link D to the adjacent door C; such gears being of a size to serve as cranks for the links and operating when turned a one half revolution to swing the doors C from closed position to an open position and when turned a one half revolution in the same or opposite direction to close the doors C. As shown the worm gears 4 are disposed at opposite sides of the worm 3 so that the latter drives both gears simultaneously but in opposite directions and the shaft 2 is preferably driven in the same direction to operate the gears to open or close the doors.

Figure 3:
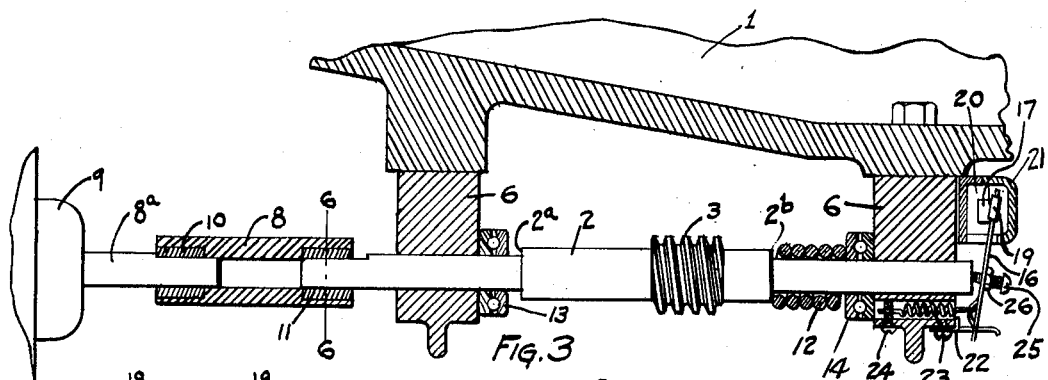
Fig. 3 is a view similar to Fig. 2, but showing the position of the parts when moved to cutout the power to the driving motor.
Figure 4:
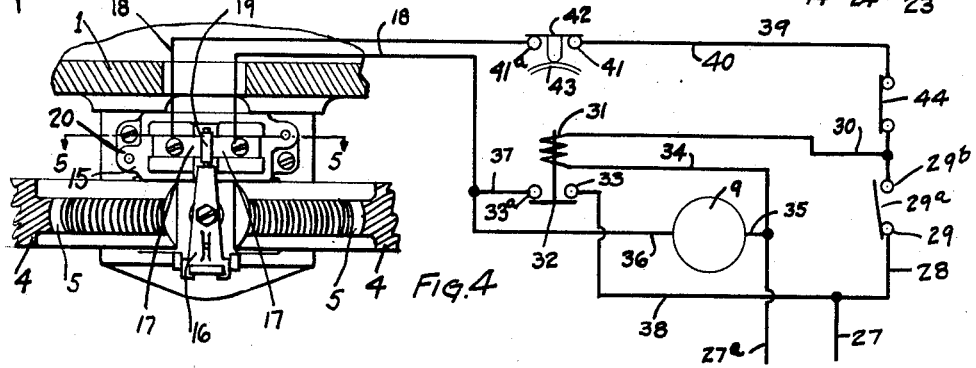
Fig. 4 is a view, partly fragmentary on the line 4—4 of Fig. 1 and partly diagrammatic to show the electric circuits.
Figure 5:
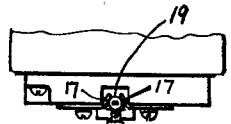
Fig. 5 is a section on the line 5—5 of Fig. 4.
Figure 6:
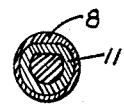
Fig. 6 is a section on the line 6—6 of Fig. 2.

In the event either gear 4 is retarded in its rotary movement or stopped for any reason, while being driven by the worm 3, as for example by an obstruction in the path of movement of either door C, the worm 3 will climb or thread the teeth of the worm gears and cause the shaft 2 to move endwise to the position shown in Fig. 3, against the tension of the spring 12, on the principle of a screw mounted in a stationary nut, wherein the latter will effect endwise movement of the screw when it is rotated. Likewise, with the parts stationary, if the doors C or gears 4 are locked and the motor is started, the worm will thread the gear teeth and move the shaft 2 endwise, as above described.

15 indicates as an entirety the cut-out devices having a movable member 16 so disposed that some portion of the shaft 2 will engage and operate the member 16, which in turn will break an electric circuit to cut-out the motor 9 and thus stop rotation of the shaft 2. As shown the parts are so arranged that relatively slight movement of the shaft effects stoppage of the motor, so that no damage to any of the parts or doors or the obstruction itself will result.

Figure 2:
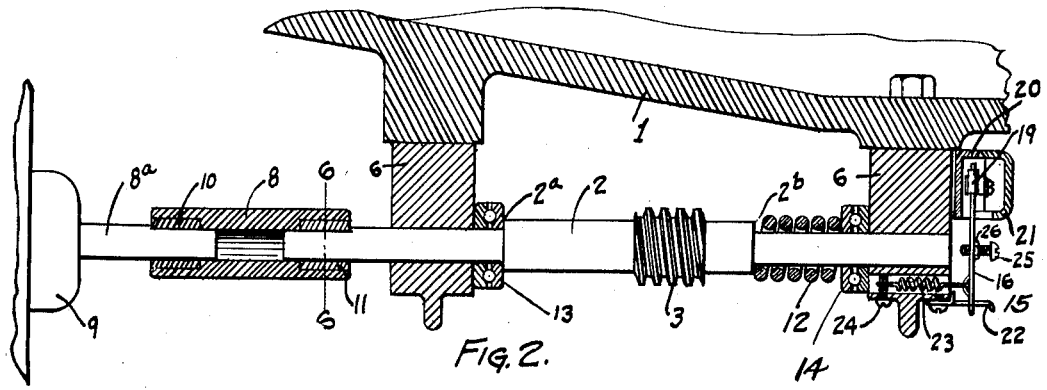
Fig. 2 is a section on the line 2—2 of Fig. 1.

Of the cut-out devices 15, 17, 17, indicate a pair of spaced terminals to which leads 18 are respectively connected. 19 indicates a bridge carried by but insulated from the movable member 16 arranged to engage and complete the circuit across the terminals 17, when the shaft 2 and movable member are in normal position (see Fig. 2). The terminals are mounted on a block 20 of insulation material, the block being preferably mounted on the adjacent hanger 6; and the terminals are protected by a casing having a cover 21; the lower side of the casing having an opening through which the member 16 extends. The lower end of the member 16 is pivoted on a plate 22 suitably secured to the hanger 6 and is biased toward the outer end of the shaft 2 by an expansion spring 23, connected at one end to the member 16 and at its opposite end connected to a suitable device, such as a screw 24. In the illustrated form of construction the free end of the plate 22 is reduced and the lower end of the member 16 is bifurcated, the bifurcations straddle the reduced end and engage and rock on the shoulders formed thereby. Intermediate its ends, the member 16 carries a screw 25 the end of which is arranged to be engaged by the outer end of the shaft 2, so that when the latter moves endwise (see Fig. 3) as already described, the member 16 will be swung outwardly to break the circuit. The screw 25 may be adjusted to control the operation of the member 16 by the shaft, being locked in its adjusted position by a nut 26.

The circuits for controlling the motor 9 comprise the following: 27, 27a, indicate the electric supply mains. 28 is a lead connected to the main 27 and to one terminal 29 of a normally open switch 29a. The other terminal 29b of the switch 29a is connected by a lead 30 to one end of a winding 31, of a suitable relay, the armature for which carries a conductor 32 arranged to engage contacts 33, 33a, for a purpose which will later appear. The other end of the winding 31 is connected by a lead 34 to the main 27a. The motor circuit comprises a lead 35 connected to one side of the motor 9 and the main 27a; and a lead 36 connected to the other side of the motor 9 and to a lead 37, the latter being connected to the contact 33a, and a lead 38 connected to the contact 33 and main 27. If now the switch 29a is closed, the winding 31 will be energized and operate its armature which in turn will effect engagement of the conductor 32 with the contacts 33, 33a, and close the motor circuit. As I prefer to use a normally open switch 29a (for example, of the push button type), I associate with the relay and motor circuits a separate or shunt circuit 39 (in which the leads 18, 18, and terminals 17, 17, and bridge member 19 are included) which maintains the relay winding energized and hence holds the conductor 32 in engagement with the contacts 33, 33a, upon and following the opening of the switch 29a so that the motor 9 continues to run until the shunt circuit is broken. The shunt circuit 39 comprises a lead 40 connected to the lead 30 and one contact 41 of a switch 42. As shown, one of the leads 18 is connected to the other contact 41a of the switch 42 and the other lead 18 is connected to the leads 36, 37. Following the opening of the switch 29a, the shunt circuit is traced as follows: main 27, lead 38, contact 33, conductor 32, contact 33a, lead 37, lead 18, one terminal 17, bridge member 19, the other terminal 17, lead 18, contact 41a, switch contact member, contact 41, lead 40, lead 30, winding 31, lead 34, main 27a. Accordingly, it will be seen that if the shunt circuit 39 is opened, either by operation of the switch 42 or operation of the member 16 to disengage the terminals 17, the winding 31 will be de-energized and break the motor circuit across the contacts 33, 33a.

To operate the motor and power transmitting members 2, 4, the push button switch 29a is closed and then released; this operation closes the circuit through the winding 31 of the relay which in turn closes the motor circuit and shunt circuit. As the doors C approach their open or closed position, a cam 43 on one of the gears 4 engages the movable element or contact member of the switch 42 and opens the shunt circuit to deenergize the winding 31, whereupon the motor circuit is opened. If, during the swinging movement of the doors C, either thereof engages an obstruction, the gear or gears 4 will be stopped and they in turn will cause the worm 3 (which is being driven by the motor) to be threaded on the teeth of the gears, the effect of which is to move the shaft 2 endwise and swing the movable member 16 out of contact with the terminals 17, and hence open the shunt circuit to stop the motor 9.

44 indicates a switch in the shunt circuit. This switch is normally closed, but may be manually operated when it is desired to stop the motor 9 or to prevent operation thereof by closing of the switch 29a.

In the form of construction shown, the motor 9 is driven in the same direction to open and close the doors C; but where the motor is reversed for each successive operation, the shaft 2 is mounted to move endwise from its normal position in opposite directions and separate cut-out devices are associated with the opposite ends of the shaft.

It will be noted that the spring 12 normally acts through the shaft 2 to maintain the worm 3 in driving relation to the gears 4 and the spring 23 normally tends to maintain the bridge member 19 in engagement with the terminals 17. Accordingly it will be seen that following the stopping of the motor 9 and removal of the obstruction which has caused the stoppage, these springs will restore these parts to normal position, the spring 12 being strong enough to move the shaft 2 and worm 3 and gears 4 far enough to effect a normal driving relation between them.

From the foregoing description it will be noted that the cut-out devices are operated mechanically and independently of the current supply to the motor or rise of current therein; also that the current is cut off before heating of the motor takes place.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of a support having hangers formed with aligned bearings, a shaft mounted in and extending through said bearings, power transmitting members in mesh with each other, one carried by said support and the other fixed to said shaft, a portion of said shaft inwardly of and adjacent one of said hangers being reduced to form a shoulder, a thrust bearing on said reduced portion disposed inwardly of the adjacent hanger, a compression spring surrounding the other reduced portion and interposed between said shoulder and said thrust bearing, and cut-out devices on the opposite side of the last-mentioned hanger having a movable device disposed in the path of movement of the shaft end extending through said hanger and arranged to be operated thereby upon endwise movement of said shaft against the tension of said spring.

2. The combination of a motor having a motor shaft, means for driving mechanism from said shaft whereby when sufficient resistance is offered to the driving operation the shaft will be moved endwise, means for normally holding said shaft in proper axial position, cooperating contacts, a resilient contact finger supporting one of said contacts and extending across the end of the shaft and arranged to move one of the contacts out of engagement with the other contact upon the endwise movement of the shaft, substantially as set forth.

3. A motor having a motor shaft, a housing associated with said motor, a piston supported by said housing and movable toward the end of the shaft, spring means for moving said piston toward the end of the shaft, and a switch engageable by said piston for breaking the circuit through the motor upon endwise movement of said shaft, substantially as set forth.

HOWARD I. MORRIS.